US005813429A

United States Patent [19]

Ohtaka et al.

[11] Patent Number: 5,813,429

[45] Date of Patent: Sep. 29, 1998

[54] COMPRESSED NATURAL GAS CHARGING SYSTEM

[75] Inventors: Akifumi Ohtaka; Hiroshi Shimanuki; Hiromi Matsuura; Masayuki Tsuchiya, all of Saitama, Japan

[73] Assignee: Honda Giken Kogyo Kabushiki Kaisha, Tokyo, Japan

[21] Appl. No.: 606,000

[22] Filed: Feb. 9, 1996

[30] Foreign Application Priority Data

Jan. 31, 1996 [JP] Japan .................................... 8-015485

[51] Int. Cl.[6] ..................................................... F16K 17/38

[52] U.S. Cl. ........................... 137/266; 137/341; 137/528

[58] Field of Search ..................................... 137/266, 263, 137/341, 511, 528; 222/3, 4

[56] References Cited

U.S. PATENT DOCUMENTS 3,837,377 9/1974 McJones ............................... 137/12 X 5,628,489 5/1997 Woodman ........................... 137/266 X

*Primary Examiner*—Kevin Lee

*Attorney, Agent, or Firm*—Lyon & Lyon LLP

[57] ABSTRACT

A compressed natural gas charging system includes a gas charging passageway whose one end is capable of being connected to a compressed natural gas supply device capable of supplying a compressed natural gas and whose other end opens into a gas vessel, and a one-way valve incorporated in the gas charging passageway to permit the compressed natural gas to flow from the one end of the gas charging passage through the one-way valve toward the other end. In the compressed natural gas charging system, a constriction is provided in the gas charging passageway downstream of the one-way valve and has a constriction degree larger than that of the one-way valve. Thus, it is possible to prevent an excessive temperature drop due to the adiabatic expansion of the compressed natural gas from occurring across the one-way valve and to rapidly charge the compressed natural gas, and it is unnecessary to use an expensive material for a part of or constituting the one-way valve.

13 Claims, 12 Drawing Sheets

COMPRESSED NATURAL GAS CHARGING SYSTEM

BACKGROUND OF THE INVENTION

1. Field of the Invention

The present invention relates to a compressed natural gas charging system including a gas charging passageway whose one end is capable of being connected to a compressed natural gas supply means capable of supplying a compressed natural gas and whose other end opens into a gas vessel, and a one-way valve incorporated in the gas charging passageway to permit the compressed natural gas to flow from one end of the gas charging passageway toward the other end.

2. Description of the Related Art

Such a system is conventionally known from, for example, Japanese Patent Application Laid-open No. 301359/95 and corresponding U.S. Pat. No. 5,542,738.

In the known system, when the compressed natural gas supply means is connected to the one end of the gas charging passageway to charge the compressed natural gas into the gas vessel, because the flow area is constricted at the one-way valve, an adiabatic expansion of the compressed natural gas is produced across the one-way valve, whereby the temperature of the compressed natural gas is dropped due to the adiabatic expansion. For this reason, when the compressed natural gas is continuously charged, the temperature around the one-way valve is substantially dropped. In order to avoid such an excessive temperature drop, it is necessary to repeatedly conduct the operation of charging the compressed natural gas at intervals while waiting for the restoration of the temperature at every operation and hence, it is difficult to conduct a rapid charging of the compressed natural gas into the gas vessel. In order to carry out the rapid charging, despite the excessive temperature drop, it is necessary to use expensive materials resistant to a low temperature such as a rubber and a synthetic resin for forming a part or component constituting the one-way valve, and/or a part or component disposed downstream of the one-way valve, which increases the cost.

SUMMARY OF THE INVENTION

Accordingly, it is an object of the present invention to provide a compressed natural gas charging system, wherein an excessive temperature drop is prevented from occurring due to the adiabatic expansion of the compressed natural gas across the one-way valve, and the rapid charging is made possible and further, it is unnecessary to use the expensive material for parts or components constituting the one-way valve.

To achieve the above object, according to the present invention, there is provided a compressed natural gas charging system comprising a gas charging passageway whose one end is capable of being connected to a compressed natural gas supply means capable of supplying a compressed natural gas and whose other end opens into a gas vessel, and a one-way valve incorporated in the gas charging passageway to permit the compressed natural gas to flow from one end of the gas charging passageway toward the other end, wherein the system further includes a constriction provided in the gas charging passageway downstream of the one-way valve, the constriction having a constriction degree larger than that of the one-way valve. Thus, the excessive temperature drop due to the adiabatic expansion of the compressed natural gas is prevented from occurring across the one-way valve, and it is avoided that an expensive material is used for the parts of the one-way valve. Thus, it is possible to rapidly charge the compressed natural gas into the gas vessel.

According to another aspect and feature of the present invention, a plurality of gas vessels are provided as the gas vessel and the one-way valve is associated as a single, common one-way valve with the plurality of vessels, and the gas charging passageway comprises a main passage section in which the single one-way valve is provided, the main passage section being connected to one of the gas vessels, a connecting passage section connected to the main passage section at a location downstream of the one-way valve to connect the gas vessels to one another, and passage branches provided in the gas vessels, respectively, one end of each of the passage branches communicating with the connecting passage section and the other end of the passage branch opening into the gas vessel, each of the passage branches including a shut-off valve which is incorporated therein and has a constriction degree in an opened state thereof smaller than that of the one-way valve, and the constriction is provided in each of the passage branches at a location downstream of the shut-off valve. Thus, by using the single one-way valve common to the plurality of gas vessels, it is possible to provide a reduction in number of parts and to simplify the passage structure.

According to a further aspect and feature of the present invention, a cylindrical temperature diffusing member forming at least a portion of a downstream section of the gas charging passageway with respect to the one-way valve is mounted so as to extend into the gas vessel, and the constriction is provided at a tip end of the temperature diffusing member. Thus, a low temperature in the vicinity of the constriction is prevented to the utmost from being propagated to the one-way valve by the transfer of heat from the surrounding compressed natural gas to the temperature diffusing member.

According to a yet further aspect and feature of the present invention, the constriction is formed as a variable constriction whose constriction degree is variable. Thus, the adiabatic expansion can be controlled by the constriction.

The above and other objects, features and advantages of the invention will become apparent from the following detailed description of preferred embodiments taken in conjunction with the accompanying drawings.

DETAILED DESCRIPTION OF THE PREFERRED EMBODIMENTS

The present invention will now be described by way of preferred embodiments with reference to the accompanying drawings.

Figure 1:
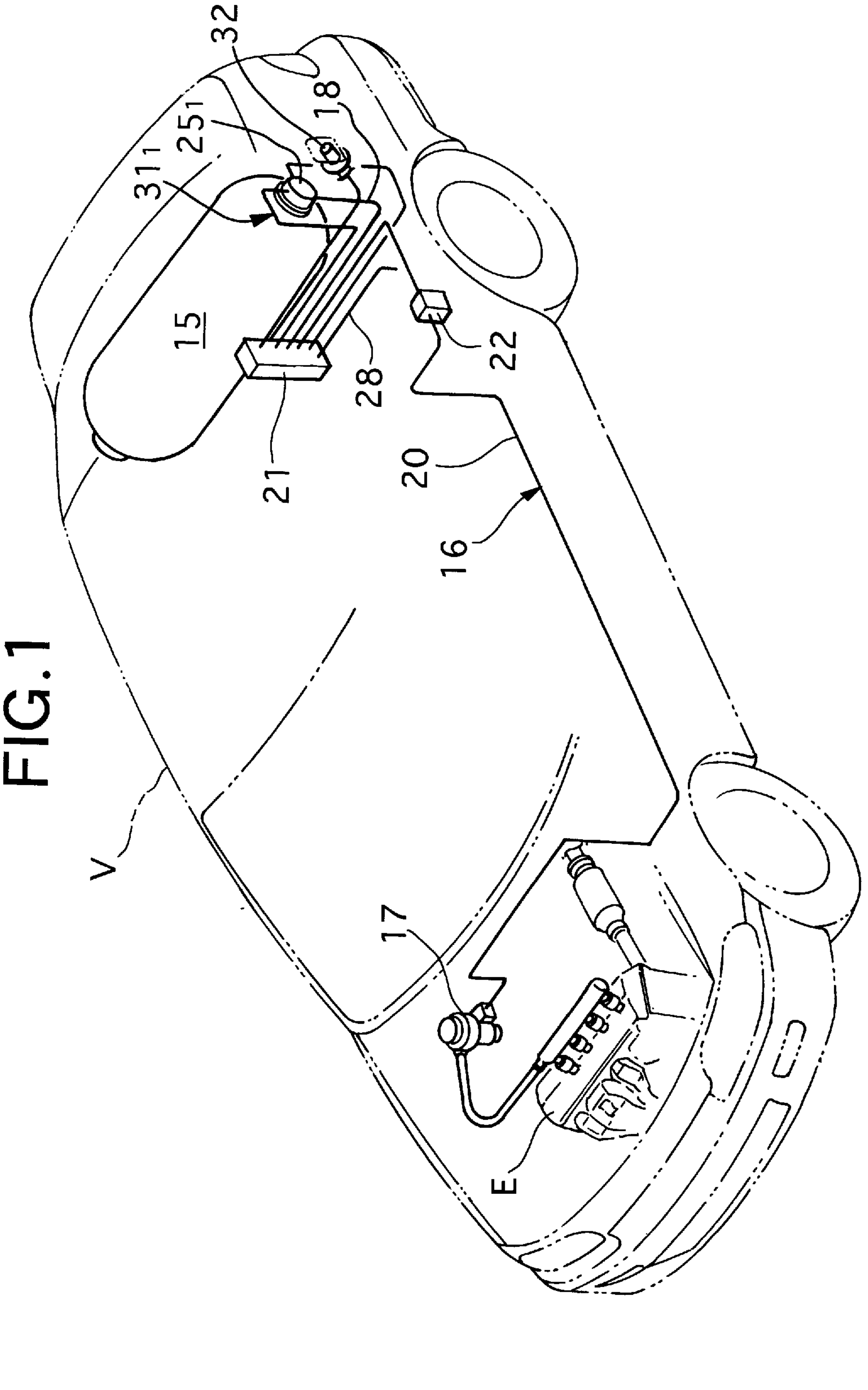
FIG. 1 is a perspective schematic view of a system for supplying a fuel to an engine in a vehicle according to a first embodiment of the present invention.
Figure 2:
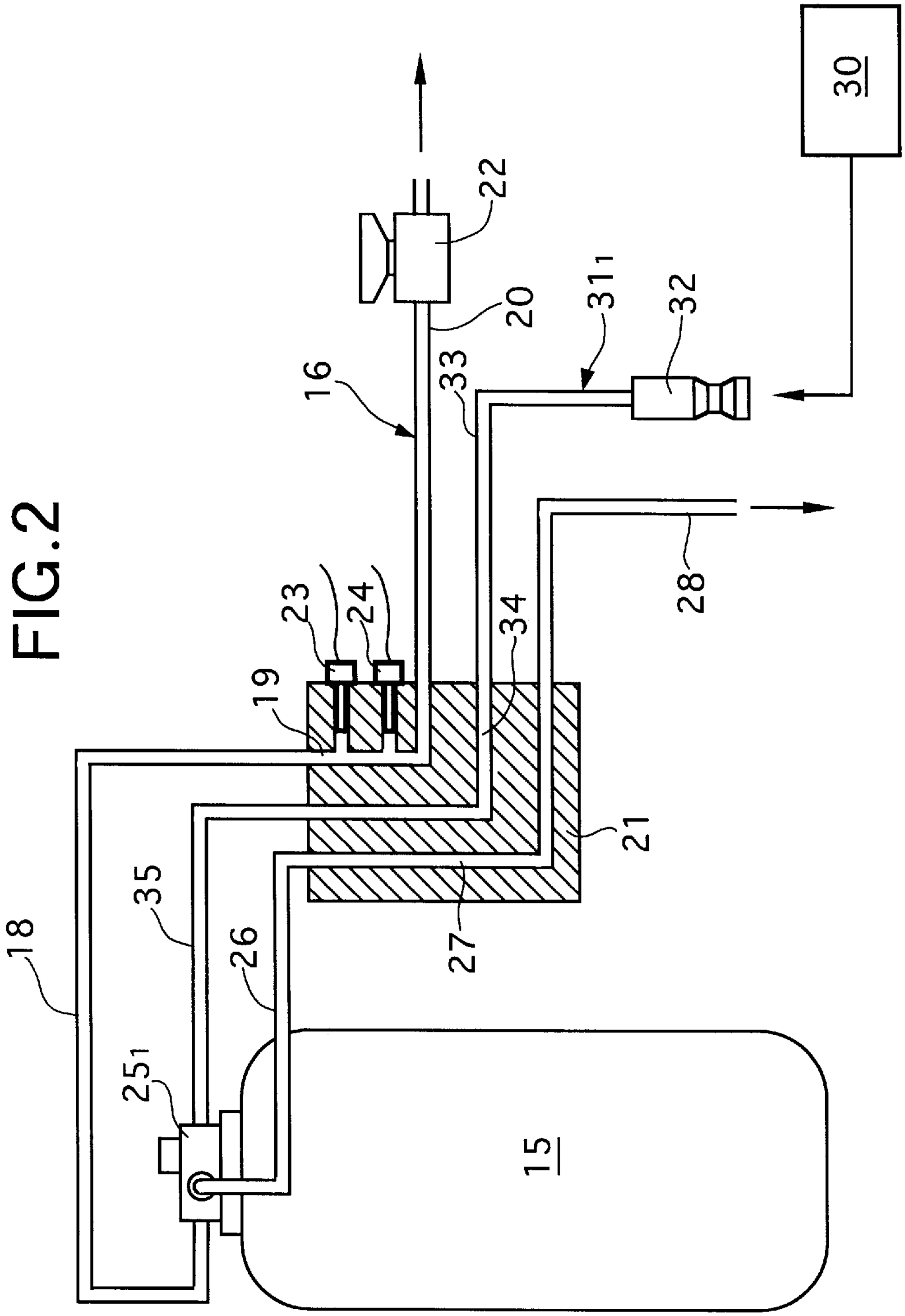
FIG. 2 is a vertical sectional view of the arrangement of an essential portion of the fuel supplying system.

Referring first to FIGS. 1 and 2, a gas vessel 15 filled with a compressed natural gas is mounted at a rear portion of a vehicle body of a vehicle V. The compressed natural gas from the gas vessel 15 is supplied via a gas fuel supply passageway 16 and a regulator 17 to an engine E which is mounted at a front portion of the vehicle body. The gas fuel supply passageway 16 includes a first supply line 18 connected at its one end to the gas vessel 15, a supply passage section 19 provided in a sensor block 21 and connected at one end to the other end of the first supply line 18, and a second supply line 20 which interconnects the other end of the supply passage section 19 and the regulator 17. The sensor block 21 is fixedly disposed at the rear portion of the vehicle body in front of the gas vessel 15, and a manual on-off valve 22 is incorporated in the second supply line 20. Mounted to the sensor block 21 are a temperature sensor 23 for detecting the temperature of the compressed natural gas flowing through the supply passage section 19, and a pressure sensor 24 for detecting the pressure of the compressed natural gas flowing through the supply passage section 19.

Figure 3:
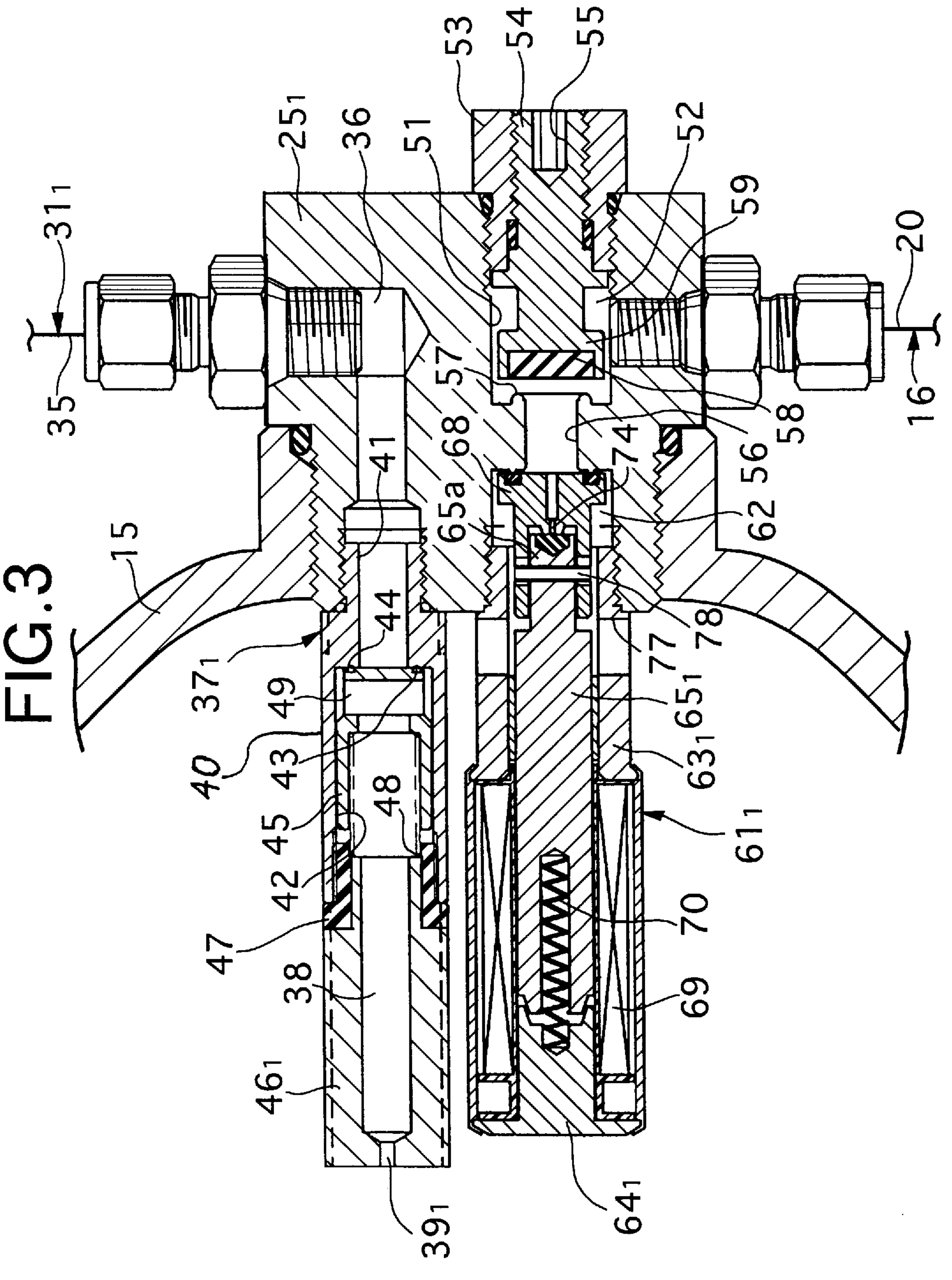
FIG. 3 is a partial vertical sectional view of a gas vessel.

Referring to FIG. 3, a plug $25_1$ is threadedly mounted at one end of the gas vessel 15. A relief valve (not shown) is incorporated in the plug $25_1$ and adapted to be opened at a predetermined temperature or higher. As shown in FIG. 2, a first relief line 26 connected to the relief valve is connected to one end of a relief passage 27 provided in the sensor block 21, and a second relief line 28 is connected at its one end to the other end of the relief passage 27. The other end of the second relief line 28 opens to the outside in the vicinity of a side of the rear portion of the vehicle body.

The compressed natural gas is charged into the gas vessel 15 by connecting a gas charging passageway $31_1$ to a compressed natural gas supply means 30 (see FIG. 2) such as a gas tank which is placed in a gasoline station or the like. The gas charging passageway $31_1$ is provided at its one end with a connecting means 32 which is capable of being connected to the compressed natural gas charging means 30. The other end of the gas charging passageway $31_1$ opens into the gas vessel 15.

The gas charging passageway $31_1$ includes a first charging line 33 having, at its one end, the connecting means 32 disposed to face a side of the vehicle body, a first charging passage section 34 provided in the sensor block 21 and connected at its one end to the other end of the first charging line 33, a second charging line 35 connected at its one end to the other end of the charging passage section 34 and at the other end of the second charging line 35 to the plug $25_1$ of the gas vessel 15, a second charging passage section 36 provided in the plug $25_1$ and connected at its one end to the second charging line 35, a one-way valve $37_1$ disposed in the gas vessel 15 and connected to the other end of the second charging passage section 36, and a third charging passage section 38 connected at its one end to the second charging passage section 36 through the one-way valve $37_1$ and extending rectilinearly within the gas vessel 15. A constriction $39_1$ is provided at the other end of the gas charging passageway $31_1$, i.e., at the other end of the third passage section 38, and opens into the gas vessel 15.

The second charging passage section 36 is provided in the plug $25_1$ to assume a substantially L shape with one end opening into an outer surface of the plug $25_1$ and with other end opening into an inner end face of the plug $25_1$ within the gas vessel 15.

The one-way valve $37_1$ has a valve housing 40 which is formed into a substantially cylindrical shape and threadedly fitted into the plug $25_1$. A valve bore 41 and a slide bore 42 having a larger diameter than that of the valve bore 41 are coaxially provided in the valve housing 40. The valve bore 41 is coaxially connected to the other end of the second charging passage section 36. An annular valve seat 43 is formed in a stepped fashion between the valve bore 41 and the slide bore 42. A valve member 45 is slidably received in the slide bore 42 and has an annular sealing portion 44 which is capable of being seated on the valve seat 43.

A cylindrical temperature diffusing member $46_1$ defining the third charging passage section 38 therein is coaxially coupled to the valve housing 40 through a cylindrical heat insulating material 47. A valve spring 48 is compressed between the temperature diffusing member $46_1$ and the valve member 45 for exhibiting a spring force in a direction to cause the sealing portion 44 to seat on the valve seat 43. Moreover, a passage 49 is provided in the valve member 45 and adapted to interconnect the second charging passage section 36 and the third charging passage section 38, when the valve member 45 is moved in such a direction that the sealing portion 44 leaves the valve seat 43.

When a gas pressure applied to the valve member 45 from the side of the second charging passage section 36 and the valve bore 41 is larger, by a predetermined value, than a pressure applied to the valve member 45 from the side of the third charging passage section 38 by the valve spring 48, the one-way valve $37_1$ is opened to permit the flowing of the compressed natural gas from the side of the second charging passage section 36 to the side of the third charging passage section 38, but to inhibit the flowing of the compressed natural gas from the side of the third charging passage section 38 back to the side of the second charging passage section 36. Moreover, because the one-way valve $37_1$ is disposed in the gas vessel 15, damaging of the one-way valve $37_1$ is avoided to the utmost, even when the vehicle is involved in a collision accident.

The heat insulating material 47 is formed from, for example, a synthetic resin, so that it is integrally coupled to one end of the temperature diffusing member $46_1$ by molding. The heat insulating material 47 is threadedly mounted to the valve housing 40, whereby the one end of the temperature diffusing member $46_1$ is coaxially coupled to the valve housing through the heat insulating material 47.

The constriction $39_1$ is a stationary constriction which is set at the given constriction degree larger than a constriction degree provided when the one-way valve $37_1$ is opened. The constriction $39_1$ is provided at the other end of the temperature diffusing member $46_1$. Thus, the other end of the third charging passage section 38 defined in the temperature diffusing material $46_1$, i.e., the other end of the gas charging passageway $31_1$, is opened into the gas vessel 15 through the constriction $39_1$.

The plug $25_1$ is provided with a recess 51 which opens into an outer end face of the plug $25_1$. A cylindrical guide member 53 is threadedly fitted into the open end of the recess 51 to define an outlet chamber 52 between the cylindrical guide member 53 and the plug $25_1$. The second supply line 20 constituting a portion of the gas fuel supply passageway 16 is connected to the outlet chamber 52.

A threaded member 54 with its outer end directed outwardly is coaxially and threadedly fitted into the guide member 53 for advancing and retreating movements. The threaded member 54 is provided at its one end with an engage hole 55 of a substantially hexagonal shape in section, into which a tool is engaged for rotating the threaded member 54.

The plug $25_1$ is provided with an outlet passage 56 coaxial with the outlet chamber 52, and a valve seat 57, into a central portion of which the outlet passage 56 opens, and which faces an inner end of the outlet chamber 52. A valve member 59 is integrally and coaxially connected to an inner end of the threaded member 54 and has a sealing portion 58 which is capable of being seated on the valve seat 57. Thus, the outlet passage 56 can be switchably put into and out of communication with the outlet chamber 52 by advancing and retreating the threaded member 54 from outside.

Figure 4:
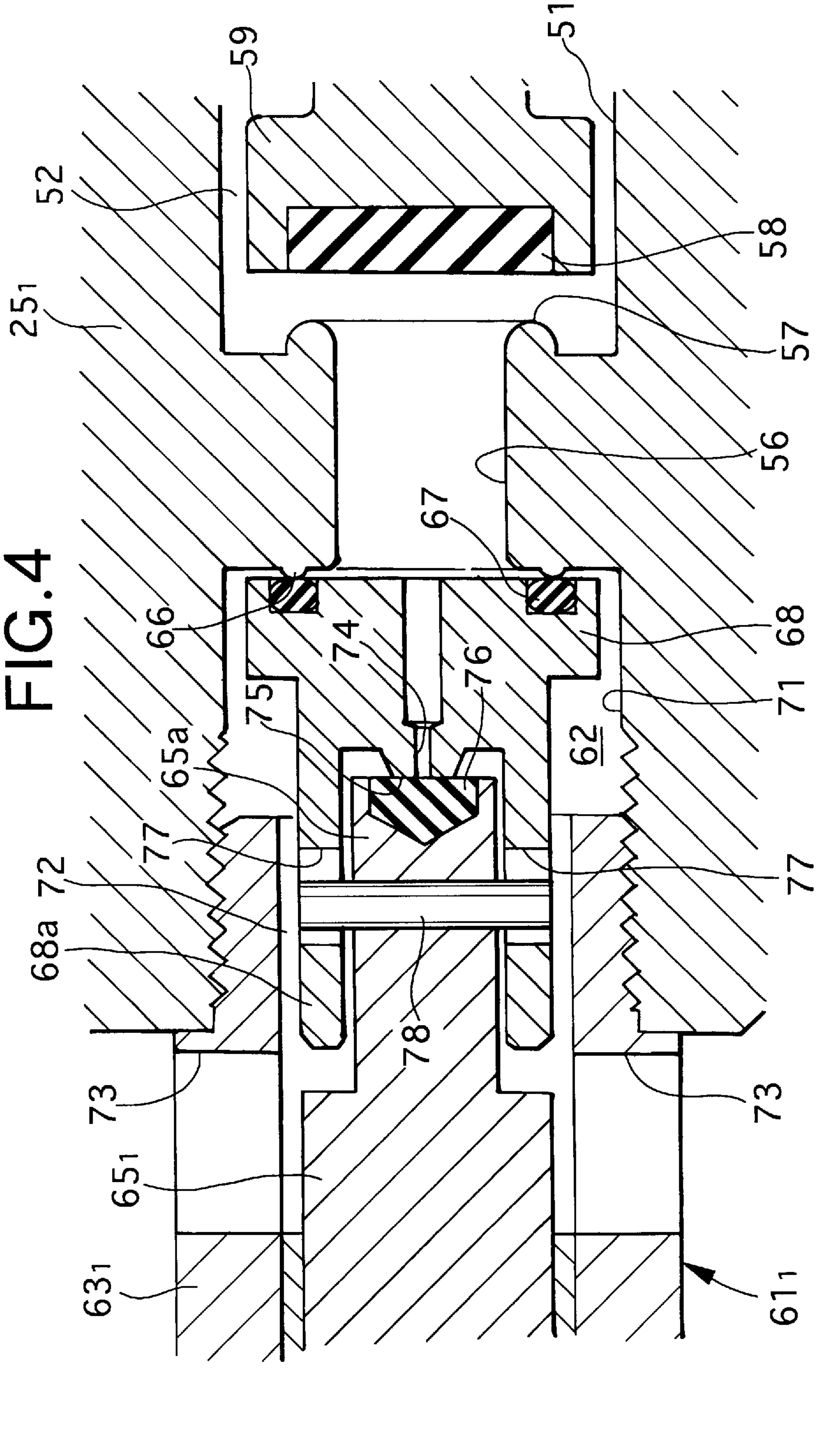
FIG. 4 is an enlarged view of an essential portion in FIG. 3.

Referring also to FIG. 4, a shut-off valve $61_1$ is mounted between the outlet passage 56 and the inside of the gas vessel 15. The shut-off valve $61_1$ includes a valve housing $63_1$ which is formed between a valve chamber 62 leading to the inside of the gas vessel 15 and plug $25_1$ and threadedly mounted at one end to the plug $25_1$, a stationary core $64_1$ fixedly mounted at the other end of the valve housing $63_1$, a plunger $65_1$ which is axially movably inserted into the valve housing $63_1$ with one end facing the valve chamber 62 and with other end being in proximity to and opposed to the stationary core $64_1$, and a valve seat 66 which is provided on the plug $25_1$ to face the valve chamber 62. The other end of the outlet passage 56 opens into a central portion of the valve seat 66. The shut-off valve $61_1$ further includes a valve member 68 connected to the other end of the plunger $65_1$ and having an annular sealing portion 67 which is capable of being seated on the valve seat 66, a coil 69 disposed in the valve housing $63_1$ and capable of exhibiting an electromagnetic force in a direction to move the plunger toward the stationary core $64_1$, and a return spring 70 which is compressed between the stationary core $64_1$ and the plunger $65_1$ to exhibit a spring force for moving the plunger $65_1$ away from the stationary core $64_1$.

A mounting bore 71 is provided in the plug $25_1$ to open into the inner end of the plug $25_1$. The mounting bore 71 has a diameter larger than that of the outlet passage 56 and is coaxial with the outlet passage 56, and one end of the cylindrical valve housing $63_1$ is threadedly fitted into the mounting bore 71. The valve chamber 62 is defined between the plug $25_1$ and the one end of the valve housing $63_1$, and an annular passage 72 is defined between the plunger $65_1$ as well as the valve member 68 and the valve housing $63_1$ and leads to the valve chamber 62. The valve housing $63_1$ is provided with a plurality of communication holes 73 which permit the passage 72 to communicate with the inside of the gas vessel 15.

A cylindrical portion 68*a* is integrally and coaxially connected to the valve member 68 and inserted into the valve housing $63_1$ to define the passage 72 between the cylindrical portion 68*a* and the valve housing $63_1$. A shaft portion 65*a* is integrally and coaxially connected to one end of the plunger $65_1$ and loosely inserted into the cylindrical portion 68*a*. The valve member 68 is provided with a pilot valve bore 74 which has a diameter far smaller than that of the outlet passage 56 and coaxially leads at one end to the outlet passage 56. A sealing portion 76 is provided at one end face of the shaft portion 65*a* and is capable of being seated on a valve seat 75 which is provided on the valve member 68. The other end of the pilot valve bore 74 opens into a central portion of the valve seat 75. A pair of elongated holes 77, 77 are provided in the cylindrical portion 68*a* to extend axially on one diametrical line of the cylindrical portion 68*a*, and a pin 78 is inserted at its opposite ends into the elongated holes 77, 77 and passed through a hole in an intermediate portion of the shaft portion 65*a*.

In such shut-off valve $61_1$, in a condition in which the coil 69 has been deenergized to locate the plunger $65_1$ at a position spaced apart from the stationary core $64_1$, the valve member 68 is in a position in which the sealing portion 67 thereof has been seated on the valve seat 66 to close the outlet passage 56, and the shaft portion 65*a* integral with the plunger $65_1$ is in a position in which the sealing portion 76 thereof has been seated on the valve seat 75 to close the valve bore 74. In this case, the pressure in the valve chamber 62, i.e., the pressure in the gas vessel 15 is applied to the valve member 68 in a direction to force the sealing portion 67 to be seated on the valve seat 66. Therefore, the valve member 68 is maintained at a closed position under the action of a relatively large force. In such a condition, it is difficult to exhibit, by the coil 69, an electromagnetic force for immediately operating the valve member 68 in an opening direction. A force obtained by multiplying, by the pressure in the gas vessel 15, a value resulting from subtraction of the sealing area of the sealing portion 76 seated on the valve seat 75 from the maximum cross-sectional area of the plunger $65_1$ is applied to the plunger $65_1$ and the shaft portion 65*a* in a direction to force the sealing portion 76 to be seat on the valve seat 75. It is not possible to exhibit an electromagnetic force by the coil 69 for overcoming such gas pressure force. Therefore, when the coil 69 is energized in the closed state of the shut-off valve $61_1$, the plunger $65_1$ is first moved toward the stationary core $64_1$, so that the sealing portion 76 of the shaft portion 65*a* integral with the plunger $65_1$ is moved away from the valve seat 75 to open the pilot valve bore 74. During this time, the opposite ends of the pin 78 moved along with the shaft portion 65*a* remain inserted in the elongated holes 77, 77 and hence, the axial relative movement of the shaft portion 65*a* relative to the valve member 68 is permitted. Thus, the difference in pressure between the valve chamber 62 and the outlet passage 56 is decreased in response to the opening of the pilot valve bore 74, thereby providing a condition in which the valve member 68 can be moved in an opening direction by a relatively small force. When the opposite ends of the pin 78 are brought into engagement with ends of the elongated holes 77, 77 adjacent the plunger $65_1$, the valve member 78 is moved in the opening direction along with the plunger $65_1$ operated by the electromagnetic force of the coil 69, thereby completely opening the outlet passage 56.

Figure 5A:
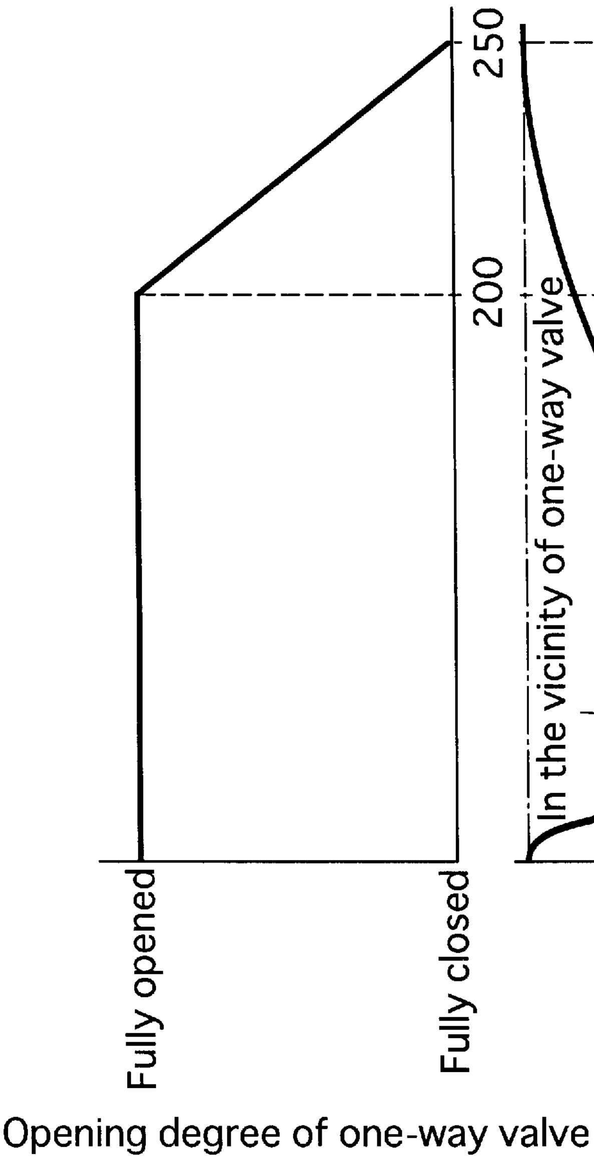
FIGS. 5A and 5B are graphs illustrating the gas charging characteristic according to the present invention.
Figure 5B:
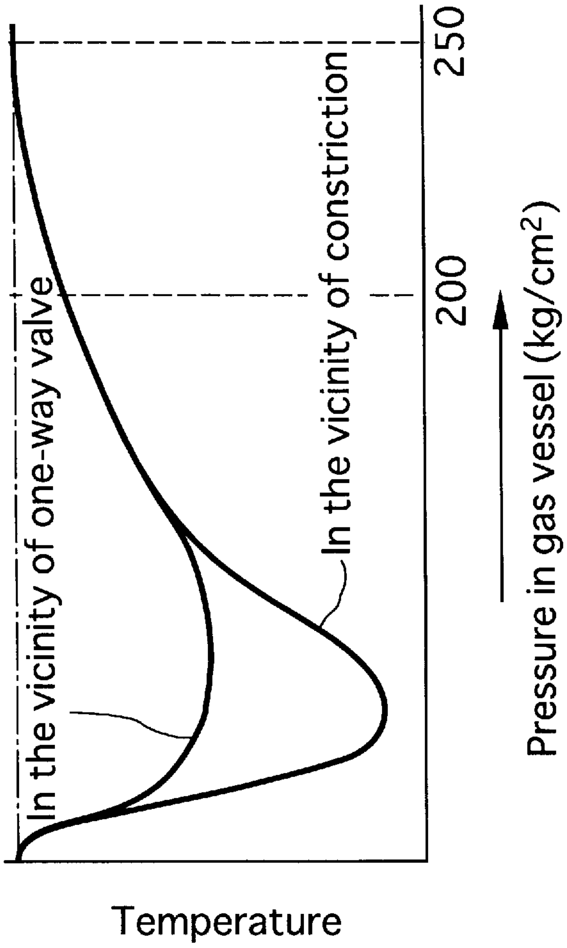

The operation of the first embodiment will be described below. If the compressed natural gas supply means 30 is connected to one end of the gas charging passageway $31_1$ when charging a compressed natural gas into the gas vessel 15, the compressed natural gas is charged into the gas vessel 15 through the one-way valve $37_1$ and the constriction $39_1$ included in the compressed gas supply passageway $31_1$. At that time, the opening degree of the one-way valve $37_1$ is varied as shown in FIG. 5A in accordance with a variation in pressure in the gas vessel 15. Since the constriction $39_1$ having the constriction degree larger than that of the one-way valve $37_1$ is provided at a downstream end of the gas charging passageway $31_1$, a temperature drop as shown in FIG. 5B occurs in the vicinity of the constriction $39_1$ due to an adiabatic expansion produced when the compressed natural gas flows through the constriction $39_1$. However, the compressed natural gas produces a loss in pressure when it flows through the one-way valve $37_1$ and hence, the pressure differential across the constriction is relatively reduced. Therefore, the extent of the adiabatic expansion at the constriction $39_1$ is suppressed, and the temperature drop in the vicinity of the constriction $39_1$ also becomes relatively small. Further, the pressure differential across the one-way valve $37_1$ is smaller than the pressure differential across the constriction $39_1$ and hence, the temperature drop in the vicinity of the one-way valve $37_1$ is less severe, as shown in FIG. 5B, and thus, the temperature is prevented from being steeply dropped in the vicinity of the one-way valve $37_1$. As a result, it is unnecessary to use an expensive material such as a rubber and a synthetic resin resistant to a low temperature for forming the one-way valve $37_1$, and it is unnecessary to wait for the restoration of the normal temperature. Therefore, it is possible to rapidly charge the compressed natural gas.

Figures 6A, 6B:
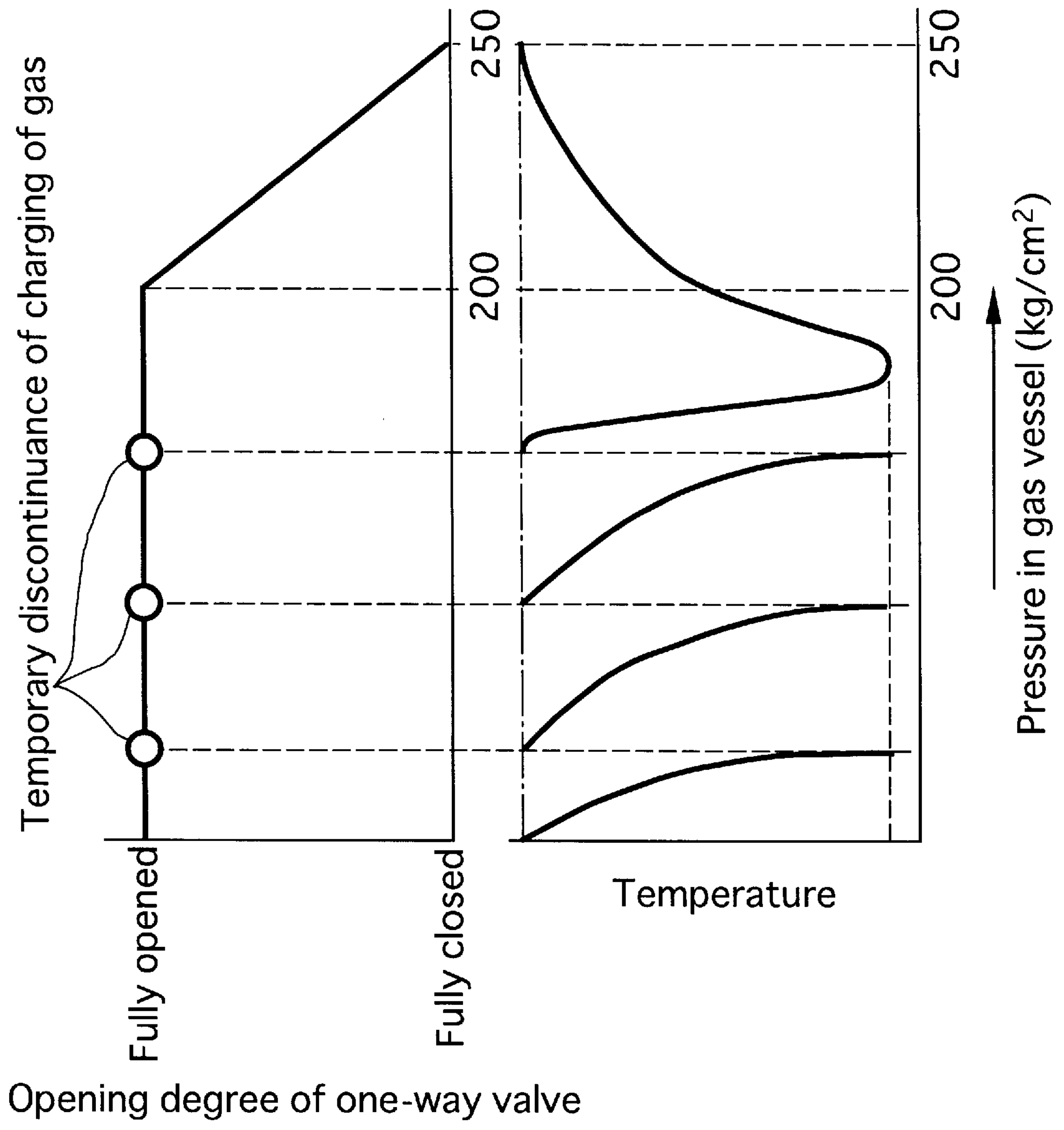
FIG.6A PRIOR ART
FIG.6B PRIOR ART
FIGS. 6A and 6B are graphs illustrating the gas charging characteristic in the prior art.

In contrast, in the prior art compressed natural gas charging system in which the constriction $39_1$ is not provided downstream of the one-way valve $37_1$, the charging characteristic is as shown in FIGS. 6A and 6B. More specifically, a steep temperature drop as shown in FIG. 6B occurs in the vicinity of the one-way valve $37_1$ due to an adiabatic expansion produced when the compressed natural gas flows through the one-way valve $37_1$. For this reason, as shown in FIG. 6A, the gas charging operation must be discontinued to for wait the restoration of the normal temperature, and it is impossible to rapidly charge the compressed natural gas into the gas vessel 15.

In addition, a temperature drop of the compressed natural gas occurs at the constriction $39_1$. However, because the cylindrical diffusing member $46_1$ forming at least a portion of the downstream section of the gas charging passageway $31_1$ from the one-way valve $37_1$ is mounted to extend into the gas vessel 15, and the constriction $39_1$ is provided at the tip end of the temperature diffusing member $46_1$, a low temperature in the vicinity of the constriction $39_1$ is prevented to the utmost from being propagated to the one-way valve $37_1$ by the transfer of heat from the surrounding compressed natural gas to the temperature diffusing member $46_1$. Further, by the fact that the heat insulating material 47 is interposed between the temperature diffusing member $46_1$ and the one-way valve $37_1$, the low temperature in the vicinity of the constriction $39_1$ is reliably prevented from being propagated to the one-way valve $37_1$.

Further, because the gas charging passageway $31_1$ and the gas supply passageway 16 are independent from each other, it is possible to provide a difference between the characteristic of charging of the compressed natural gas into the gas vessel 15 and the characteristic of supplying of the compressed natural gas from the gas vessel 15.

Figure 7:
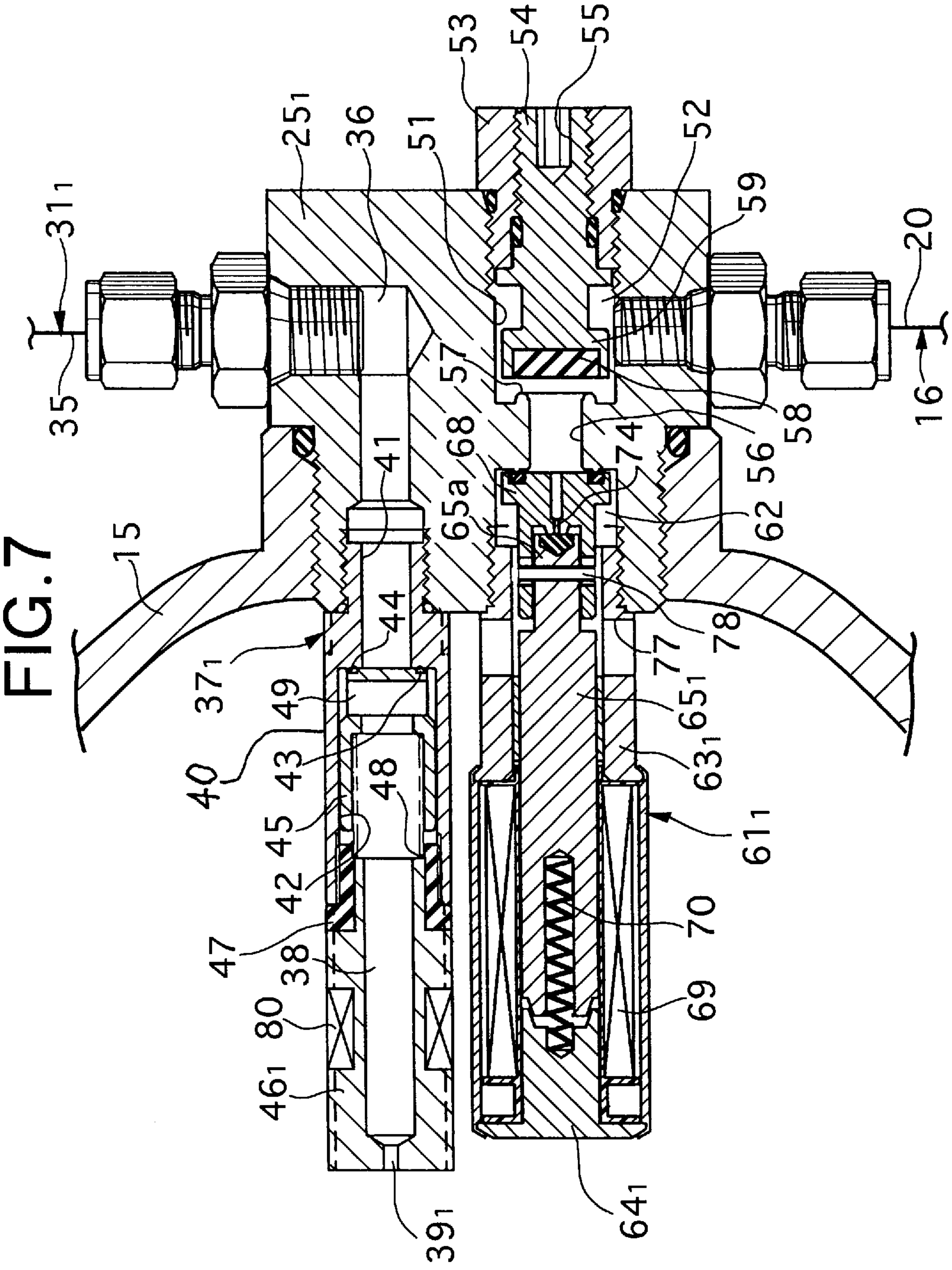
FIG. 7 is a sectional view similar to FIG. 3, but illustrating a fuel supplying system according to a second embodiment of the present invention.

FIG. 7 illustrates a second embodiment of the present invention. In the second embodiment, an electric heater 80 is mounted in an outer surface of the temperature diffusing member $46_1$. Thus, the low temperature in the vicinity of the constriction $39_1$ is reliably prevented from being propagated to the one-way valve $37_1$ by heating by the electric heater 80, and it is unnecessary to use an expensive material such as a rubber and a synthetic resin resistant to a low temperature for forming the one-way valve $37_1$. In addition, it is possible to rapidly charge the compressed natural gas.

Figure 8:
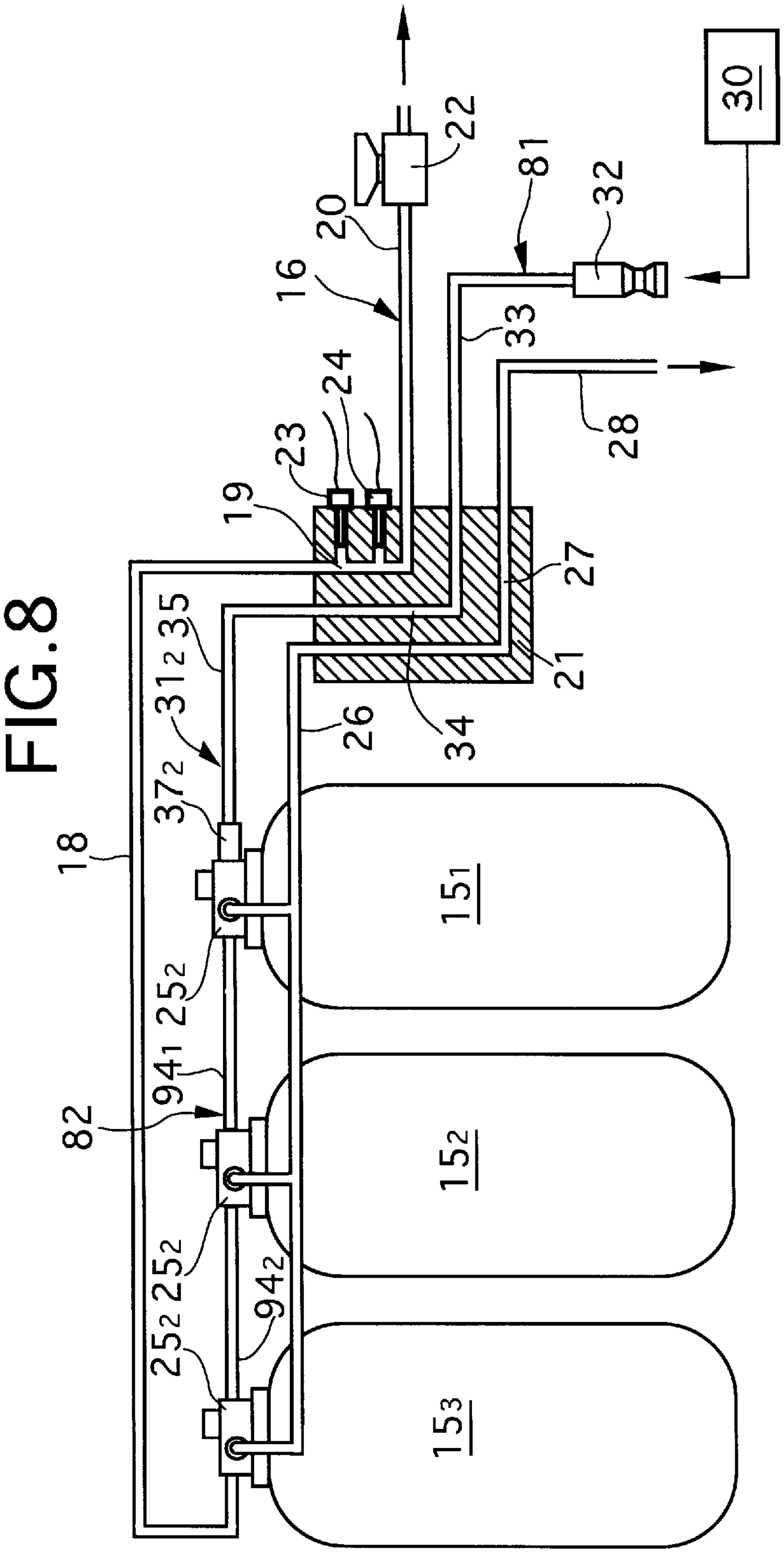
FIG. 8 is a vertical sectional side view of the arrangement of an essential portion of a fuel supplying system according to a third embodiment of the present invention.
Figure 9:
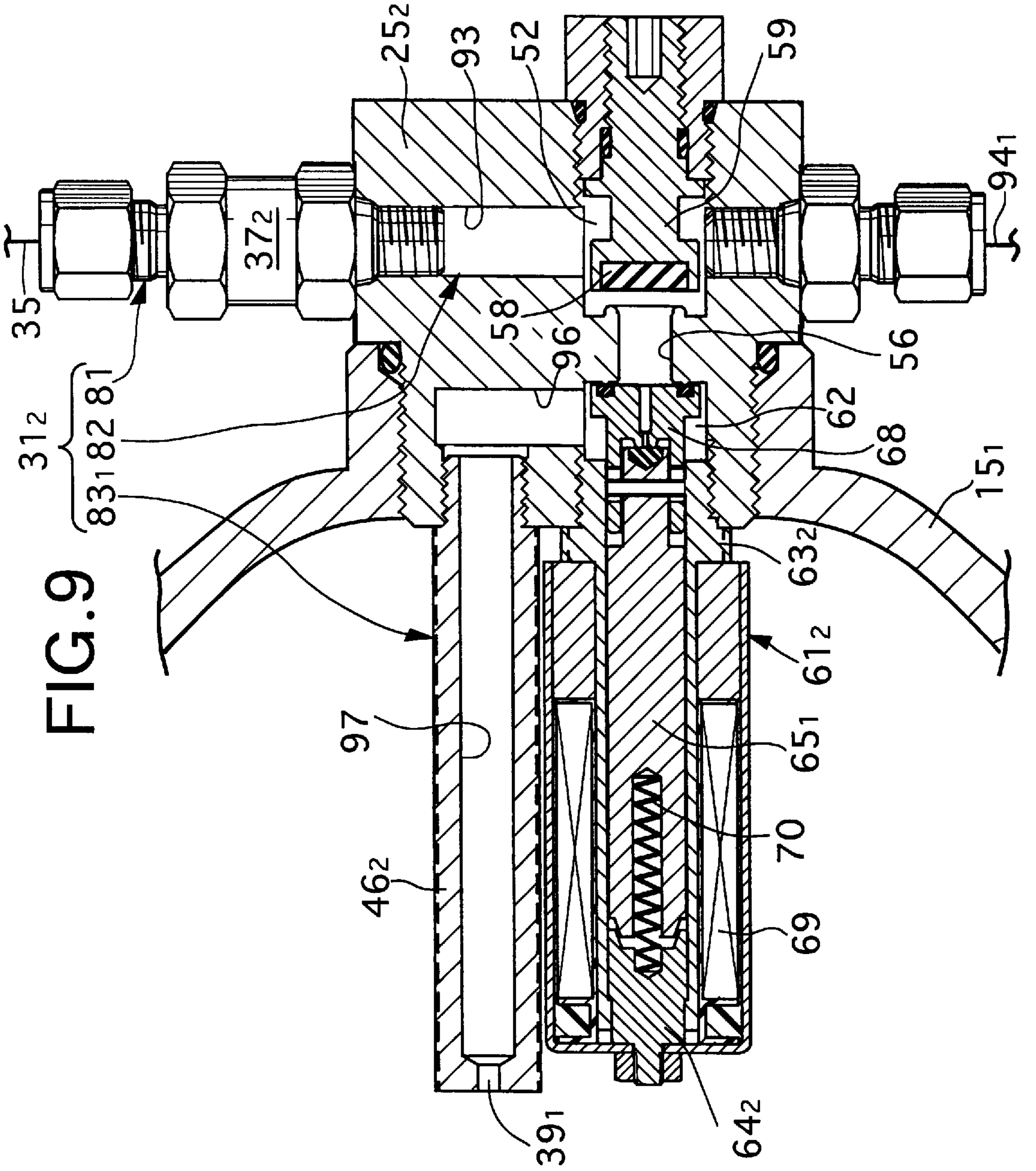
FIG. 9 is a partial vertical sectional view of a gas vessel of the third embodiment.
Figure 10:
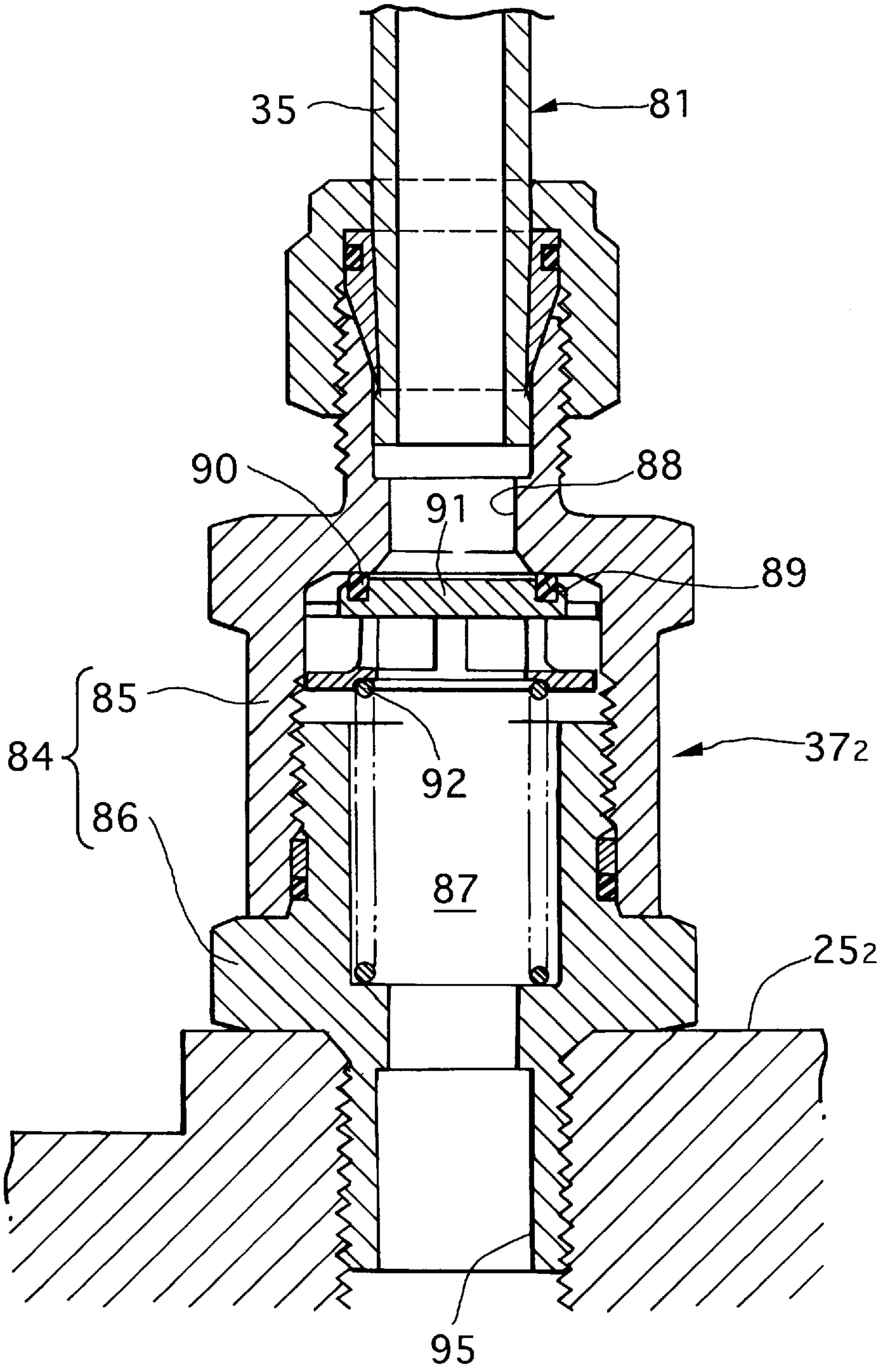
FIG. 10 is an enlarged vertical sectional view of a one-way valve of the third embodiment.

FIGS. 8 to 10 illustrate a third embodiment of the present invention. FIG. 8 is a vertical sectional side view of the arrangement of an essential portion of a fuel supplying system; FIG. 9 is a partially vertical sectional view of a gas vessel; and FIG. 10 is an enlarged vertical sectional view of a one-way valve.

Referring first to FIG. 8, a plurality of, e.g., three first, second and third gas vessels $15_1$, $15_2$ and $15_3$ filled with a compressed natural gas are mounted in the vehicle V (see FIG. 1). A plug $25_2$ is threadedly mounted at one end of each of the gas vessels $15_1$, $15_2$ and $15_3$, and a relief valve (not shown) is mounted in the plug $25_2$ and adapted to be opened at a predetermined temperature or higher. A first relief line 26 commonly connected to these relief valves is connected to one end of a relief passage 27 provided in the sensor block 21, and a second relief line 28 is connected at its one end to the other end of the relief passage 27.

Referring also to FIG. 9, the compressed natural gas is charged into each of the gas vessels $15_1$, $15_2$ and $15_3$ by connecting a gas charging passageway $31_2$ to the compressed natural gas supply means 30. The gas charging passageway $31_2$ includes: a main passage section 81 which has a single one-way valve $37_2$ common to the gas vessels $15_1$, $15_2$ and $15_3$ and which is connected to one of the gas vessels $15_1$, $15_2$ and $15_3$, e.g., the first gas vessel $15_1$; a connecting passage section 82 connected to the main passage section 81 downstream of the one-way valve $37_2$ for connecting the gas vessels $15_1$, $15_2$ and $15_3$ to one another; and passage branches $83_1$ provided in the gas vessels $15_1$, $15_2$ and $15_3$. One end of each of the passage branches $83_1$ communicates with the connection passage section 82, and the other end opens into the gas vessels $15_1$, $15_2$ and $15_3$, respectively.

The main passage section 81 includes a first charging line 33 having, at its one end, a connecting means 32 which is capable of being connected to the compressed natural gas supply means 30, a first charging passage 34 provided in the sensor block 21 and having one end communicated with the other end of the first charging line 33, a second charging line 35 having one end connected to the other end of the first charging passage 34, and a one-way valve $37_2$ interposed between the plug $25_2$ of the first gas vessel $15_1$ and the second charging line 35.

Referring to FIG. 10, a valve housing 84 of the one-way valve $37_2$ includes a first housing half 85 air-tightly connected to the second charging line 35, and a second housing half 86 which is threadedly fitted into the plug $25_2$ of the first gas vessel $15_1$ and also threadedly fitted to the first housing half 85. A valve chamber 87 is defined within the valve housing 84.

A valve bore 88 is provided in the first housing half 85 and coaxially connected to the second charging line 35. An annular valve seat 89 is also provided in the first housing half 85, and an end of the valve bore 88 opens into the valve chamber 87 at a central portion of the valve seat 89. A valve member 91 is accommodated in the valve chamber 87 and has an annular sealing portion 90 which is capable of being seated on the valve seat 89. The valve member 91 is formed into a shape which permits the compressed natural gas to flow toward the plug $25_2$ when the sealing portion 90 is moved away from the valve seat 89. Moreover, a valve spring 92 is compressed between the valve member 91 and the second housing half 86 for biasing the valve member 91 in a direction to force the sealing portion 90 to be seated on the valve seat 89.

The connecting passage section 82 includes: outlet chambers 52 provided in the plugs $25_2$, respectively; communication passages 93 which are provided in the plugs $25_2$ to traverse the outlet chambers 52, respectively; a communication line $94_1$ which permits the communication passages 93 in the first and second gas vessels $15_1$ and $15_2$ to communicate with each other; and a communication line $94_2$ which permits the communication passages 93 in the second and third gas vessels $15_2$ and $15_3$ to communicate with each other. A communication bore 95 (see FIG. 10) is provided in the second housing half 86 to lead to the valve chamber 87 in the one-way valve $37_2$, and is in communication with the communication passage 93 in the first gas vessel $15_1$. A first supply line 18 of a gas fuel supply passageway 16 (see FIG. 8) is in communication with the communication passage 93 in the third gas vessel $15_3$.

Referring particularly to FIG. 9, the passage branch $83_1$ includes: an outlet passage 56 provided in the plug $25_2$ such that its end opening into the outlet chamber 52 can be closed by the sealing portion 58 of the valve member 59; a passage 96 provided in the plug $25_2$ such that it can be switchably put into and out of communication with the outlet passage 56 by a shut-off valve $61_2$ mounted at an inner end of the plug $25_2$; a passage 97 which is defined in a cylindrical temperature diffusing member $46_2$ attached at its base end to the inner end of the plug $25_2$ substantially in parallel to the shut-off valve $61_2$, with one end of the passage 97 communicating with the passage 96; and a constriction $39_1$ provided at a tip end of the temperature diffusing member $46_2$ and leading to the other end of the passage 97. The shut-off valve $61_2$ is formed so that the constriction degree in its closed state is smaller than that of the one-way valve $37_2$.

The shut-off valve $61_2$ includes: a valve housing $63_2$ threadedly mounted at its one end to the plug $25_2$ to define a valve chamber 62 between the valve housing $63_2$ and the plug $25_2$; a stationary core $64_2$ fixedly mounted at the other end of the valve housing $63_2$; a plunger $65_1$ which is axially movably inserted into the valve housing $63_2$ with one end facing the valve chamber 62 and with the other end being in proximity to and opposed to the stationary core $64_2$; a valve member 68 connected to the other end of the plunger $65_1$ and capable of closing the other end of the outlet passage 56; a coil 69 disposed in the valve housing $63_2$ and capable of exhibiting an electromagnetic force in a direction to urge the plunger $65_1$ toward the stationary core $64_2$; and a return spring 70 compressed between the stationary core $64_2$ and the plunger $65_1$ to exhibit a spring force for urging the plunger $65_1$ away from the stationary core $64_2$. The structure of the connection of the plunger $65_1$ and the valve member 68 is identical to those in the first and second embodiments.

The passage 96 is provided in the plug $25_2$ with one end thereof communicating with the valve chamber 62, and the temperature diffusing member $46_2$ is threadedly attached to the inner end of the plug $25_2$, such that the passage 97 provided therein communicates with the other end of the passage 96.

In the third embodiment, the connecting passage section 82 of the gas charging passageway $31_2$ also functions as a passage for supplying the compressed natural gas from each of the gas vessels $15_1$, $15_2$ and $15_3$, and the one-way valve $37_2$ is mounted as a single part common to the gas vessels $15_1$, $15_2$ and $15_3$. Thus, it is possible to provide a reduction in the number of parts and simplify the passage structure.

Moreover, the constriction $39_1$ is disposed downstream of the shut-off valve $61_2$ and has the constriction degree larger than that of the one-way valve $37_1$ and that of the shut-off valve $61_2$ (when it is opened) disposed downstream of the one-way valve $37_2$. Therefore, as in the previously described embodiments, it is avoided that excessive adiabatic expansion of the compressed natural gas is produced across the one-way valve $37_2$, and it is unnecessary to use an expensive material such as a rubber and a synthetic resin resistant to a low temperature for forming the one-way valve $37_1$. Therefore, it is possible to rapidly charge the compressed natural gas.

Additionally, the cylindrical temperature diffusing member $46_2$ forming at least a portion of the downstream section of the gas charging passageway $31_2$ from the shut-off valve $61_2$ is mounted to extend into the gas vessel $15_1$, and the constriction $39_1$ is provided at the tip end of the temperature diffusing member $46_2$. Therefore, the low temperature in the vicinity of the constriction $39_1$ is prevented to the utmost from being propagated to the shut-off valve $61_2$ and the one-way valve $37_2$ by the transfer of heat from the surrounding compressed natural gas to the temperature diffusing member $46_2$.

In the third embodiment, a heat insulting material may be interposed between the temperature diffusing member $46_2$ and the plug $25_2$, and an electric heater 80 (see FIG. 7) may be mounted in the temperature diffusing member $46_2$.

Figure 11:
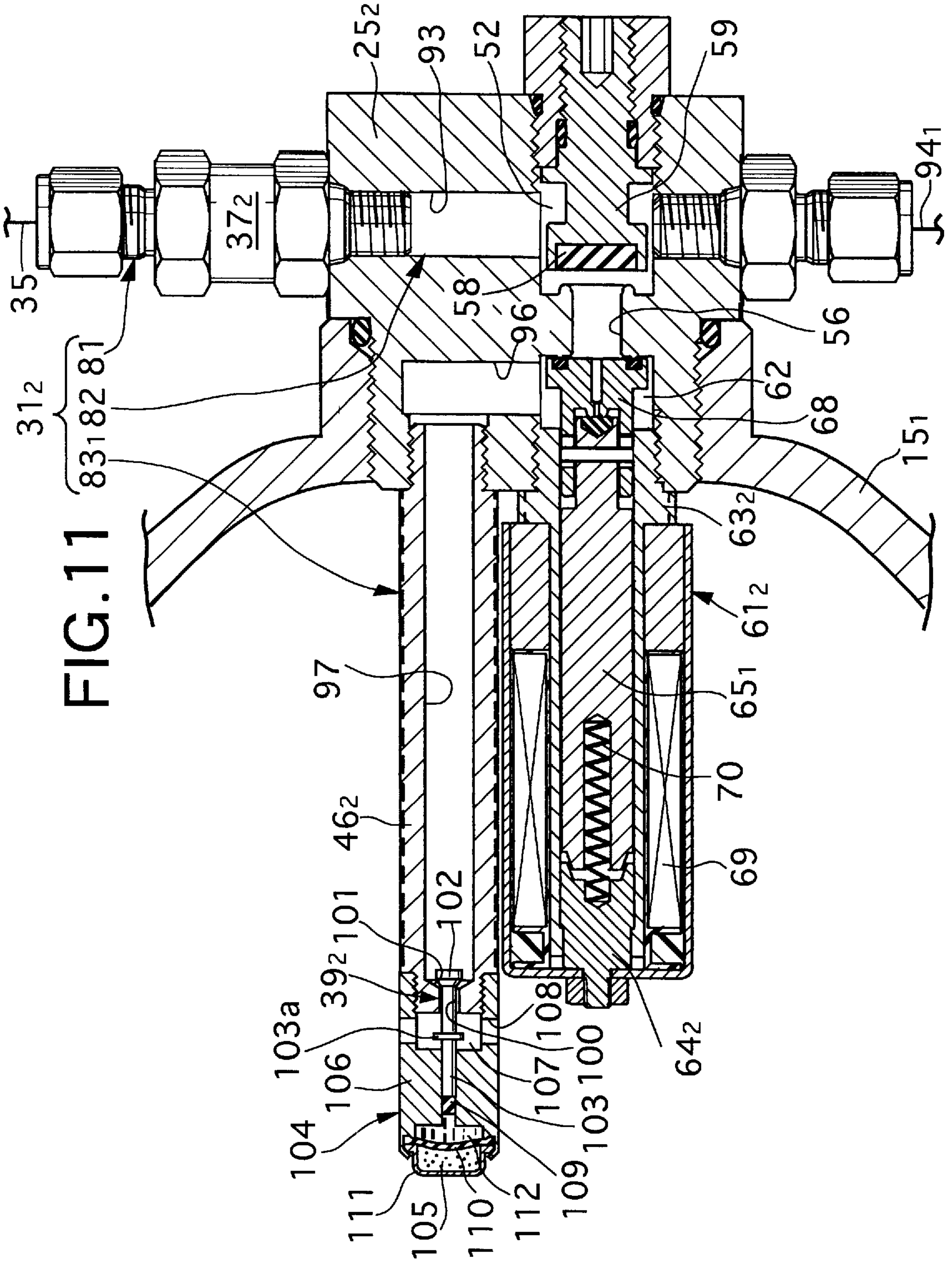
FIG. 11 is a sectional view similar to FIG. 3, but illustrating a fuel supplying system according to a fourth embodiment of the present invention.

FIG. 11 illustrates a fourth embodiment of the present invention, wherein portions or components corresponding to those in the third embodiment are designated by like reference characters.

The fourth embodiment is substantially similar to the third embodiment, but is different from third embodiment in that the constriction degree of a constriction $39_2$ provided at the tip end of the temperature diffusing member $46_2$ is variable such that it is increased with a reduction in surrounding temperature.

This constriction $39_2$ includes a tapered surface 101 which is provided on an inner surface of a tip end of the temperature diffusing member $46_2$ and into a central portion of which a through-hole 100 coaxially provided in the tip end of the temperature diffusing member $46_2$ opens, a shaft 103 inserted into the through-hole 100 and having at one end a valve portion 102 opposed to the tapered surface 101, and an actuator 104 connected to the shaft 103.

The actuator 104 is movable axially, as the volume of a wax 105 is varied by a variation in temperature. The actuator 104 has a housing 106 which is fixedly connected at its base end to the temperature diffusing member $46_2$ to define a lead-out chamber 107 leading to the through-hole 100 between the housing 106 and the tip end of the temperature diffusing member $46_2$. A plurality of radial communication bores 108 are provided in the housing 106 for permitting the lead-out chamber 107 to communicate with the inside of the gas vessel $15_1$.

The other end of the shaft 103 is passed through the lead-out chamber 107 and slidably fitted in the housing 106. One end of a sealing member 109 slidably fitted in the housing 106 abuts against the other end of the shaft 103. A limiting flange **103*a* is integrally provided at an intermediate portion of the shaft 103 in the lead-out chamber 107 to protrude radially outwardly. The limiting flange 103*a* functions to limit the movement of the shaft 103 toward an axially other end, i.e., the movement of the shaft 103 in a direction to increase the constriction degree with movement of the valve portion 102 toward the tapered surface 101, by the abutment against the housing 106**.

A peripheral edge of a diaphragm 110 is clamped at a tip end of the housing 106, and a dish-like cap 111 is secured to the tip end of the housing 106 for charging a wax 105 between the cap 111 and the diaphragm 110. An oil 112 is filled between the diaphragm 110 and the housing 106, and the other end of the sealing member $\mathbf{39}_2$ faces the oil 112.

Such constriction $\mathbf{39}_2$ ensures that if the temperature of the compressed natural gas in the gas vessel $\mathbf{15}_1$ is dropped, the shaft 103 is moved in a direction to increase the constriction degree due to a reduction in volume of the wax, and if the temperature is increased, the shaft 103 is moved in a direction to decrease the constriction degree due to an increase in volume of the wax 105. Therefore, at a low temperature, the amount of compressed natural gas being charged can be suppressed to limit the adiabatic expansion, and at a higher temperature, the charging speed can be increased sufficiently.

Figure 12:
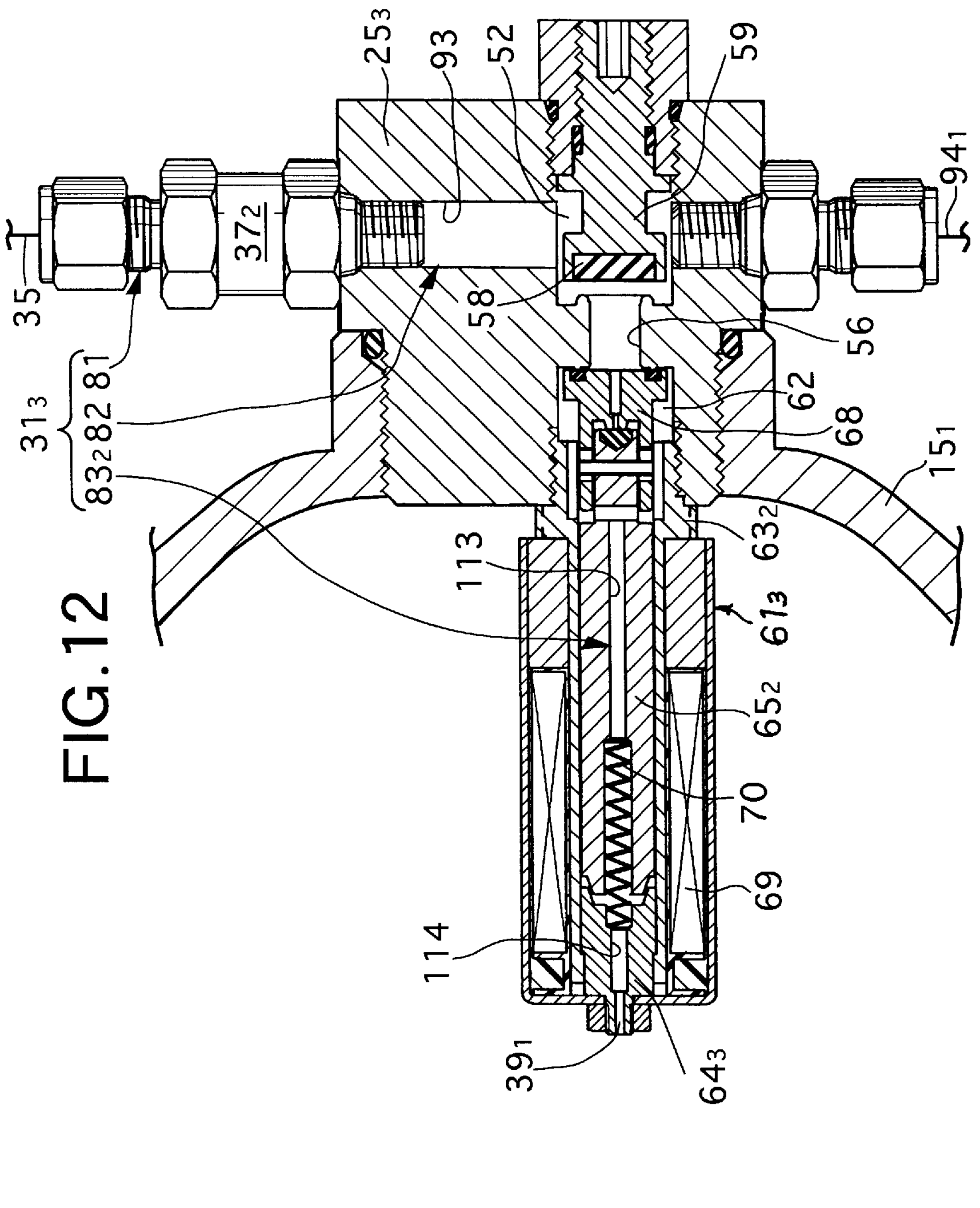
FIG. 12 is a sectional view similar to FIG. 3, but illustrating a fuel supplying system according to a fifth embodiment of the present invention.

FIG. 12 illustrates a fifth embodiment of the present invention, wherein portions or components corresponding to those of each of the previously described embodiments are designated by like reference characters.

Each of the passage branches $\mathbf{83}_2$ constitutes a gas charging passageway $\mathbf{31}_3$ together with a main passage section 81 having a one-way valve $\mathbf{37}_2$ and a connecting passage section 82 connected to the main passage section 81 downstream of the one-way valve $\mathbf{37}_2$. The passage branch $\mathbf{83}_2$ includes: an outlet passage 56 which is provided in a plug $\mathbf{25}_3$ such that its end opening into the outlet chamber 52 can be closed by the sealing portion 58 of the valve member 59; a passage 113 which is provided in a plunger $\mathbf{65}_2$ of a shut-off valve $\mathbf{61}_3$ mounted to an inner end of the plug $\mathbf{25}_3$, such that the passage 113 can be switchably put into and out of communication with the outlet passage 56 by the shut-off valve $\mathbf{61}_3$; a passage 114 provided in a stationary core $\mathbf{64}_3$ of the shut-off valve $\mathbf{61}_3$ and leading to the passage 113; and a constriction $\mathbf{39}_1$ which is provided in the stationary core $\mathbf{64}_3$ and coaxially connected to the passage 114 and which opens into the gas vessel $\mathbf{15}_1$.

The shut-off valve $\mathbf{61}_3$ includes: a valve housing $\mathbf{63}_2$ which is threadedly attached at its one end to the plug $\mathbf{25}_3$ to define a valve chamber 62 between the valve housing $\mathbf{63}_2$ and the plug $\mathbf{25}_3$; a stationary core $\mathbf{64}_3$ fixedly mounted at the other end of the valve housing $\mathbf{63}_2$; a plunger $\mathbf{65}_2$ which is axially movably inserted into the valve housing $\mathbf{63}_2$ with one end of the plunger $\mathbf{65}_2$ facing the valve chamber 62 and the other end being in proximity to and opposed to the stationary core $\mathbf{64}_3$; a valve member 68 connected to the other end of the plunger $\mathbf{65}_2$ and capable of closing the other end of the outlet passage 56; a coil 69 disposed in the valve housing $\mathbf{63}_2$ and capable of exhibiting an electromagnetic force in a direction to urge the plunger $\mathbf{65}_2$ toward the stationary core $\mathbf{64}_3$; and a return spring 70 compressed between the stationary core $\mathbf{64}_3$ and the plunger $\mathbf{65}_2$ to exhibit a spring force for urging the plunger $\mathbf{65}_2$ away from the stationary core $\mathbf{64}_3$. The structure of the connection of the plunger $\mathbf{65}_2$ and the valve member 68 is identical to that in each of the previously described embodiments.

The passage 113 is coaxially provided in the plunger $\mathbf{65}_2$ with its one end communicating with the valve chamber 62, and the passage 114 is provided in the stationary core $\mathbf{64}_3$, so that it is coaxially connected to the passage 113.

In the fifth embodiment, in addition to the prevention of the generation of an excessive adiabatic expansion across the one-way valve $\mathbf{37}_2$, the passage structure can be simplified by formation of the passage branch $\mathbf{83}_2$ in the shut-off valve $\mathbf{61}_3$.

Although the embodiments of the present invention have been described in detail, it will be understood that the present invention is not limited to the above-described embodiments, and various modifications in design may be made without departing from the spirit and scope of the invention defined in the claims.

What is claimed is:

1. A compressed natural gas charging system comprising a gas charging passageway having one end capable of being connected to a compressed natural gas supply means capable of supplying a compressed natural gas and another end opening into a gas vessel, a one-way valve incorporated in the gas charging passageway and operable by a difference in pressure between locations in said gas charging passagewav upstream and downstream of said one-way valve for permitting the compressed natural gas to flow from said one end of the gas charging passageway toward said another end, and a constriction provided in said gas charging passageway downstream of said one-way valve, said constriction having a constriction degree larger than that of said one-way valve.

2. A compressed natural gas charging system comprising a gas charging passageway having one end capable of being connected to a compressed natural gas supply means capable of supplying a compressed natural gas and another end opening into a plurality of gas vessels, a single one-way valve incorporated in the gas charging passageway to permit the compressed natural gas to flow from said one end of the gas charging passageway toward said another end, said gas charging passageway comprises a main passage section in which said single one-way valve is provided, said main passage section being connected to one of said gas vessels, a connecting passage section connected to said main passage section at a location downstream of said one-way valve to connect said gas vessels to one another, and passage branches provided in said gas vessels, respectively, one end of each of said passage branches communicating with said connecting passage selection and the other end of said passage branch opening into said gas vessel, each of said passage ranches including a shut-off valve which is incorporated therein and has a constriction degree in an opened state of said shut-off valve smaller than that of said single one-way valve, and said constriction is provided in each of said passage branches at a location downstream of said shut-off valve.

3. A compressed natural gas charging system according to claim 2, further including a cylindrical temperature diffusing member forming at least a portion of a downstream section of the gas charging passageway with respect to the one-way valve, said cylindrical temperature diffusing member being mounted so as to extend into said gas vessel, said constriction being provided at a tip end of said temperature diffusing member.

4. A compressed natural gas charging system according to claim 3, further including a heat insulating material provided between said one-way valve and said temperature diffusing member.

5. A compressed natural gas charging system according to claim 3, further including an electric heater mounted to said temperature diffusing member.

6. A compressed natural gas charging system according to claim 2 wherein said constriction is formed as a variable constriction whose constriction degree is variable.

7. A compressed natural gas charging system according to claim 6, wherein the constriction degree of said variable constriction is increased, as a temperature around constriction is dropped.

8. A compressed natural gas charging system according to claim 4, further including an electric heater mounted to said temperature diffusing member.

9. A compressed natural gas charging system comprising a gas charging passageway having one end capable of being connected to a compressed natural gas supply means capable of supplying a compressed natural gas and another end opening into a gas vessel, a one-way valve incorporated in the gas charging passageway to permit the compressed natural gas to flow from said one end of the gas charging passageway toward said another end, a constriction provided in said gas charging passageway downstream of said one-way valve, said constriction having a constriction degree larger than that of said one-way valve, and a cylindrical temperature diffusing member forming at least a portion of a downstream section of the gas charging passageway with respect to the one-way valve, said cylindrical temperature diffusing member being mounted so as to extend into said gas vessel, said constriction being provided at a tip end of said temperature diffusing member.

10. A compressed natural gas charging system according to claim 9, further including a heat insulating material provided between said one-way valve and said temperature diffusing member.

11. A compressed natural gas charging system according to claim 9 or 10 further including an electric heater mounted to said temperature diffusing member.

12. A compressed natural gas charging system comprising a gas charging passageway having one end capable of being connected to a compressed natural gas supply means capable of supplying a compressed natural gas and another end opening into a gas vessel, a one-way valve incorporated in the gas charging passageway to permit the compressed natural gas to flow from said one end of the gas charging passageway toward said another end, a constriction provided in said gas charging passageway downstream of said one-way valve, said constriction having a constriction degree larger than that of said one-way valve, and said constriction being formed as a variable constriction whose constriction degree is variable.

13. A compressed natural gas charging system according to claim 12, wherein the constriction degree of said variable constriction is increased as a temperature around said constriction is dropped.

* * * * *

UNITED STATES PATENT AND TRADEMARK OFFICE

CERTIFICATE OF CORRECTION

PATENT NO. : 5,813,429
DATED : September 19, 1998
INVENTOR(S) : Ohtaka et al.

It is certified that error appears in the above-identified patent and that said Letters Patent is hereby corrected as shown below:

Column 12,
Line 10, after "charging" delete "passagewav" and substitute -- passageway --
Line 35, after "passage" delete "ranches" and substitute -- branches --

Signed and Sealed this

Second Day of April, 2002

*Attest:*

JAMES E. ROGAN
*Director of the United States Patent and Trademark Office*

*Attesting Officer*